United States Patent
Ridder et al.

(10) Patent No.: US 10,453,494 B2
(45) Date of Patent: Oct. 22, 2019

(54) FACILITATING SYNCHRONIZATION OF MOTION IMAGERY AND AUDIO

(71) Applicant: ADOBE INC., San Jose, CA (US)

(72) Inventors: Yaniv De Ridder, San Francisco, CA (US); Michael Spencer Cragg, Berkeley, CA (US); Colin Cronin Roache, Oakland, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/403,035

(22) Filed: Jan. 10, 2017

(65) Prior Publication Data
US 2018/0197578 A1    Jul. 12, 2018

(51) Int. Cl.
| | | |
|---|---|---|
| G11B 27/00 | (2006.01) | |
| G11B 27/031 | (2006.01) | |
| G11B 27/10 | (2006.01) | |
| H04N 5/93 | (2006.01) | |

(52) U.S. Cl.
CPC ............ *G11B 27/031* (2013.01); *G11B 27/10* (2013.01)

(58) Field of Classification Search
CPC .......... H04N 5/932; H04N 5/935; H04N 5/93; G11B 27/00
USPC .......................... 386/201, 207, 285, 278, 280
See application file for complete search history.

(56) References Cited

U.S. PATENT DOCUMENTS

| | | | | |
|---|---|---|---|---|
| 5,387,943 | A * | 2/1995 | Silver | H04N 5/04 348/512 |
| 6,898,759 | B1 * | 5/2005 | Terada | G10H 1/0066 345/473 |
| 10,180,775 | B2 * | 1/2019 | Laska | G08B 13/19613 |
| 2010/0080532 | A1 * | 4/2010 | Ubillos | G06F 3/0486 386/241 |

* cited by examiner

*Primary Examiner* — Daquan Zhao
(74) *Attorney, Agent, or Firm* — Shook, Hardy & Bacon, L.L.P.

(57) ABSTRACT

Embodiments of the present invention provide systems, methods, and computer storage media for facilitating synchronization of audio with motion imagery. In embodiments, an indication to create a relationship between an audio feature associated with an audio and an imagery feature associated with a motion imagery is received. Thereafter, a relationship is created between the audio feature and the imagery feature in accordance with an instance or a time duration to synchronize the audio with the motion imagery. Based on the relationship between the audio feature and the imagery feature, the imagery feature of the component is automatically manipulated in relation to the audio feature at the designated instance or the time duration.

20 Claims, 11 Drawing Sheets

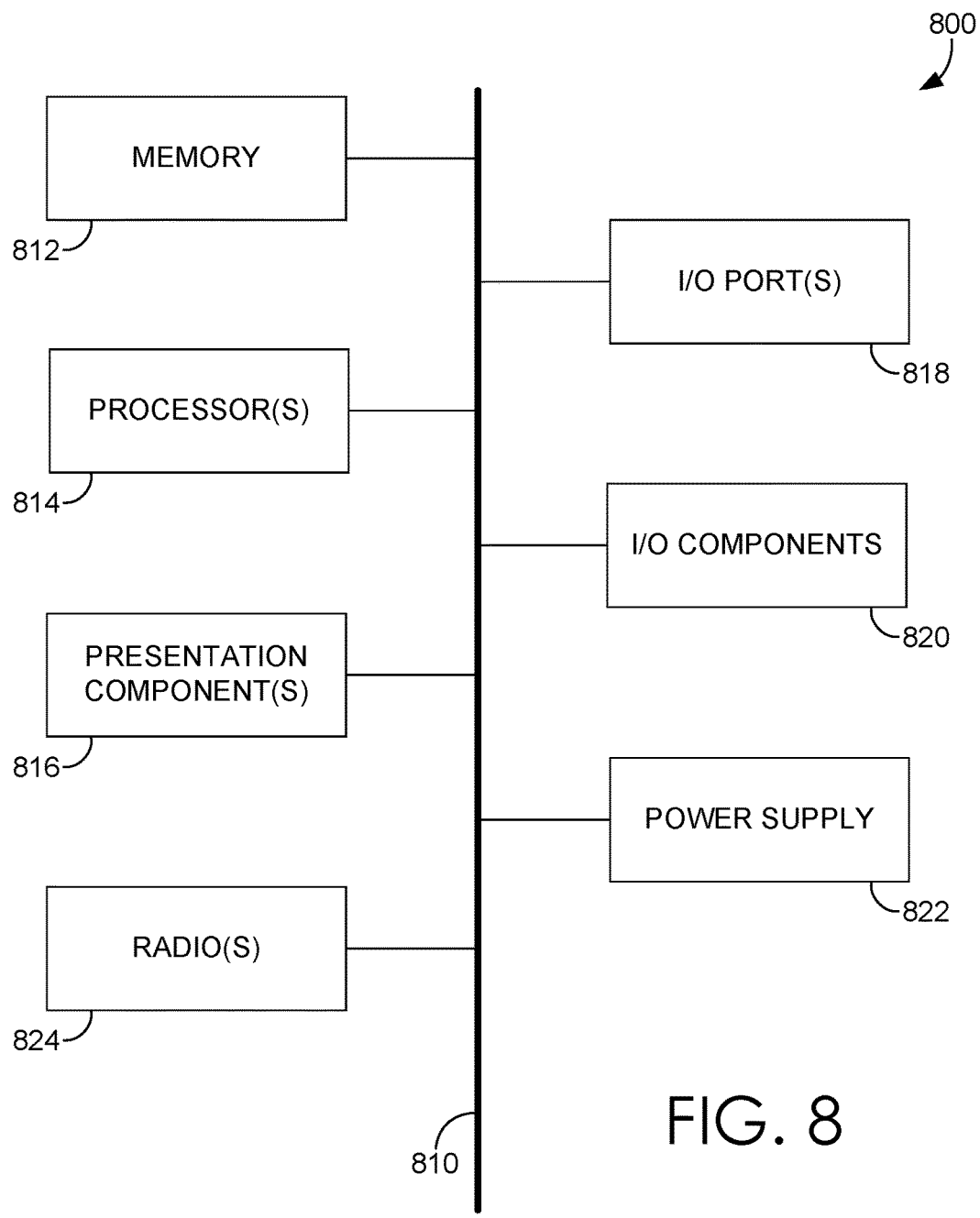

FACILITATING SYNCHRONIZATION OF MOTION IMAGERY AND AUDIO

BACKGROUND

Oftentimes, a user desires to synchronize an aspect(s) of a motion clip with an audio. Typically, to align aspects, a user manually selects to align various portions of a motion clip with the audio. For example, to begin a motion clip at a particular point in the audio (e.g., align with a beat), a user can drag the beginning of the motion clip to that particular audio point in time to align the video with the audio as desired. Manually aligning multiple instances of a motion clip with audio, however, can be very time consuming. For instance, a user may align one aspect of a motion clip with an audio, preview the motion clip to verify accuracy, and then make any necessary modifications. Such a process can be repeated for each instance the motion clip is desired to be aligned with the audio. Further, audio data exposed for aligning with aspects of a motion clip is limited in conventional approaches such that alignment of a motion clip with audio is substantially restricted.

SUMMARY

Embodiments of the present invention are directed to facilitating synchronization of audio with motion imagery. In this regard, relationships between motion imagery and audio are generated to align or coordinate motion imagery with the audio in accordance with the user's preferences. Based on a relationship created between a motion imagery and audio at a particular time or during a particular time range, the motion imagery can be automatically manipulated or adjusted to correspond with an audio aspect during that time. By way of example only, based on a relationship existing between a scale of a component and an amplitude of an audio, the component scale can be automatically manipulated to correspond with the audio amplitude (e.g., increase component scale as the audio amplitude increases). As such, a user can efficiently and effectively create multimedia commensurate with the user's expectations or desires.

BRIEF DESCRIPTION OF THE DRAWINGS

The present invention is described in detail below with reference to the attached drawing figures, wherein:

FIG. 8 is a block diagram of an exemplary computing environment suitable for use in implementing embodiments of the present invention.

DETAILED DESCRIPTION

Overview

Figure 1:
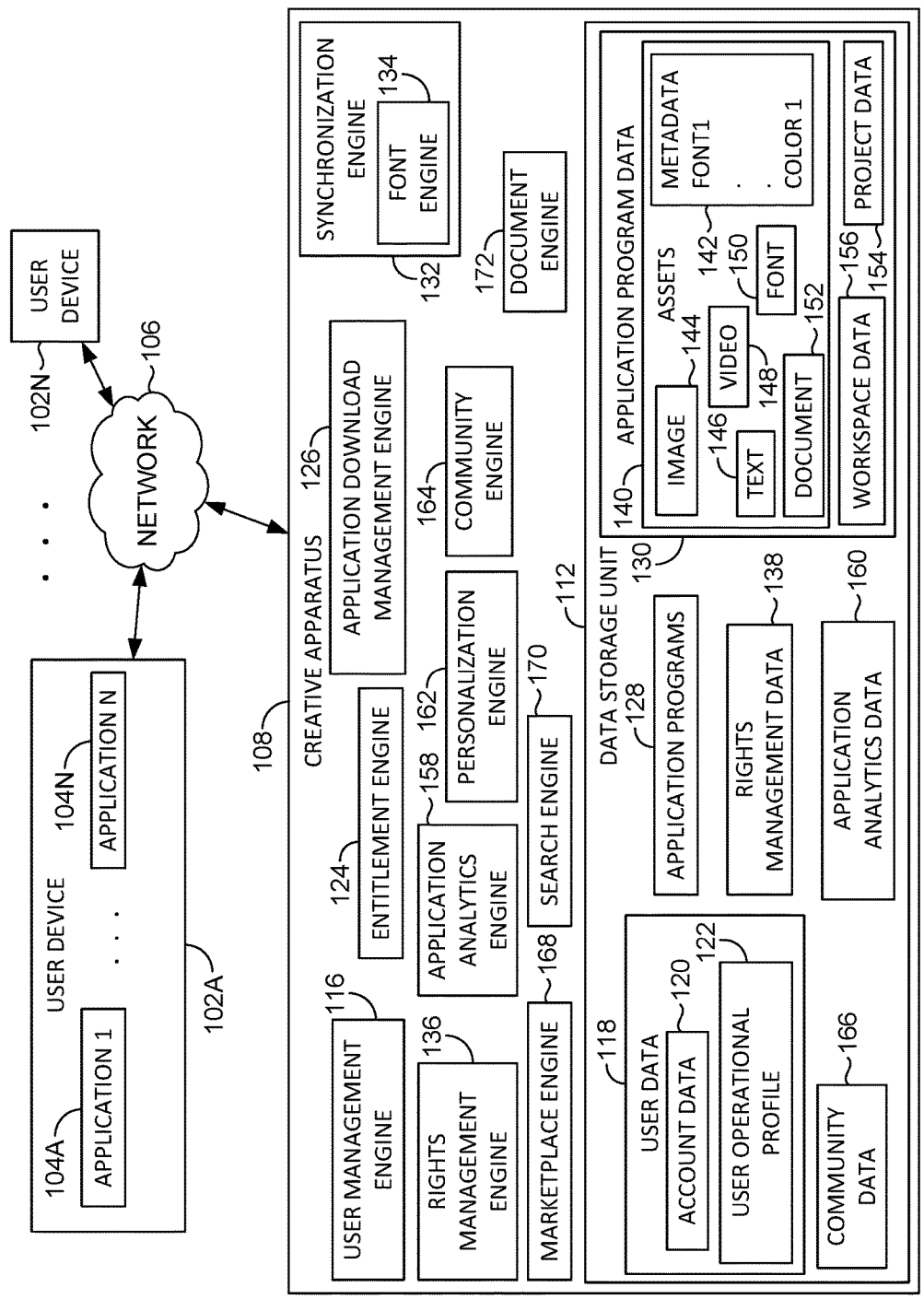
FIG. 1 is a block diagram of an exemplary computing environment in which embodiments of the invention may be employed.

Various terms are used throughout this description. Although more details regarding various terms are provided throughout this description, general definitions of some terms are included below to provider a clearer understanding of the ideas disclosed herein:

Motion imagery generally refers to any type of motion that includes a sequence of images, or frames, displayed over time. In some implementations, a motion imagery may include any number of components or objects within the motion imagery that may be manipulated.

A component or motion imagery component refers to an object associated with a motion imagery that can be manipulated (e.g., increased in size, rotated, moved in position, changed in color or opacity, etc.).

An imagery feature refers to a feature or attribute associated with a motion imagery component that may be modified. Exemplary imagery features include, but are not limited to, position, rotation, opacity, and scale.

An audio feature refers to a feature or attribute associated with an audio. Exemplary audio features include, but are not limited to, beats, events, and amplitude.

A key frame designates or defines an instance at which an association between an imagery feature and an audio feature occurs.

A key frame range (or key range) refers to a range of key frames or a time duration during which an association between an imagery feature and an audio feature occurs.

Having briefly described various terms used throughout this description, an overview is provided. Oftentimes, a user (e.g., a motion designer or a video editor) might desire to add audio to a video or motion graphic. Accordingly, a user might supplement motion imagery with audio. Motion imagery is used herein to refer to any type of image motion that includes a sequence of images, or frames, displayed over time. Motion imagery may include, by way of example, videos or motion graphics. Audio generally refers to any type of audio including, but not limited to, songs, voice, etc.

In some cases, a user may desire to choreograph visuals or portions of the motion imagery with portions of the audio. To assist in the editing of motion imagery, some tools have been developed that provide mechanisms to edit motion imagery. Such tools enable a user to edit many aspects of a motion imagery as desired by the user. Generally, with conventional editing tools, however, a user manually aligns or synchronizes aspects of the motion imagery with aspects of a desired audio. For example, to begin a motion clip at a particular point in the audio (e.g., align with a beat), a user can drag the beginning of the motion clip to that particular audio point in time to align the video with the audio as desired. As another example, to generate a loop, a user generally performs numerous iterations of moving start and end points in an effort to create a loop in which the motion clip loops as desired with the audio. While some existing editing tools enable a user to aggregate a motion clip with audio, the audio data exposed to the user is very limited resulting in limited applications. For instance, audio data available is typically limited to a simple waveform representing amplitude. Further, the users are generally required to identify aspects of interest and manually associate motion clips with audio.

Accordingly, embodiments of the present invention are directed to facilitating synchronization of audio with motion imagery. In particular, relationships between motion imagery and audio are generated to align or coordinate motion imagery with the audio in accordance with the user's preferences. As such, a user can efficiently and effectively create multimedia commensurate with the user's expectations or desires. To effectuate a desired synchronization, a user can select to relate an audio feature with an imagery feature associated with a component of a motion imagery. Such a selection or indication can be provided in any number of manners, for example, by selecting both imagery and audio features. Based on the indication to relate an audio feature with an imagery feature, a key frame or key frame range can be created along a timeline to represent an instance at which or a duration during which the imagery and audio features are related. As such, during presentation of the motion imagery at the key frame or key frame range, the imagery feature (e.g., scale of a component) is manipulated in accordance with the audio feature (e.g., amplitude of the audio).

By way of example only, assume that a user specifies an association or relationship between an amplitude audio feature and a scale imagery feature associated with a first component (e.g., a circle). Further assume that a user specifies an association or relationship between a beat audio feature and a rotation imagery feature associated with a second component (e.g., a rectangle). Accordingly, a first key frame range can be generated for a first time duration to relate the amplitude with the scale of the first component, and a second key frame range can be generated for a second time duration to relate the beat of the audio with the rotation of the second component. During presentation of the motion imagery, for example, the first component can be manipulated during the first key frame range such that the scale of the first component increases as the amplitude of the audio increases and the scale of the first component decreases as the amplitude of the audio decreases. Further, the second component can be manipulated during the second key frame range such that the second component is rotated when a beat is detected.

Example Computing Environment

FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device includes at least one application supported by the creative apparatus 108 or the marketing apparatus 110. It is to be appreciated that following description may generally refer to the user device 102A as an example and any other user device can be used.

A user of the user device can utilize various products, applications, or services supported by the creative apparatus 108 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to a creative apparatus 108 via a network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiment, the user management engine 116 and the entitlement engine 124 can be one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 104A-104N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 130 in the data storage unit 112 by a synchronization engine 132. Alternatively or additionally, such data can be stored at the user device, such as user device 102A.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

A user can operate one or more user devices to access data. In this regard, the application program data 130 is accessible by a user from any device, including a device which was not used to create the assets 140. This is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or the other user are logged in, then a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article, a recommendation can also be made by the synchronization engine 132 to incorporate some of other assets saved by the user and relevant for the article. Such a recommendation can be generated using one or more engines, as described herein.

The creative apparatus 108 also includes a community engine 164 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users is assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

Figure 2:
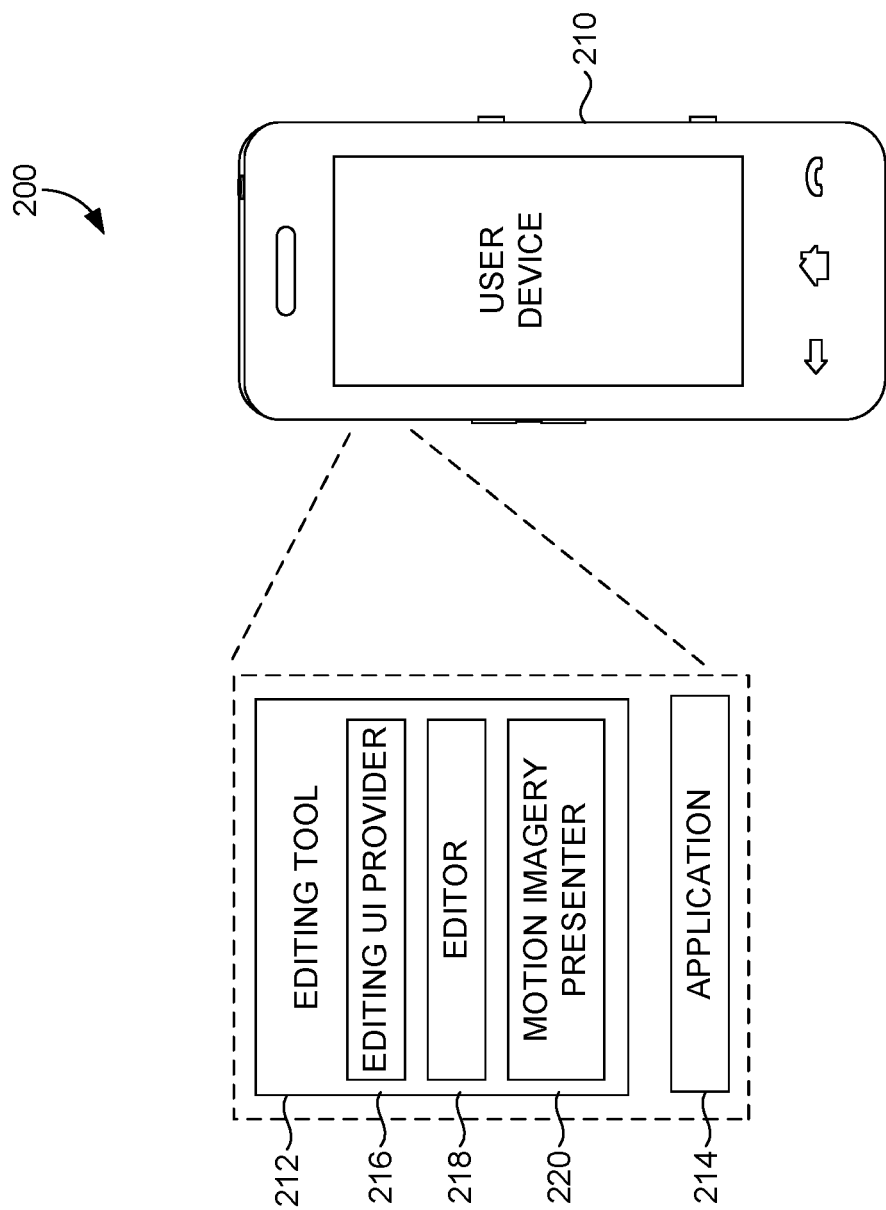
FIG. 2 is a block diagram of an exemplary computing system for facilitating motion imagery editing, in accordance with embodiments of the present invention.

In accordance with embodiments of the present invention, application programs 128 can include a motion imagery application that includes an editing tool, as further described in FIG. 2. The motion imagery application can be provided to the user device 102A such that the motion imagery application operates via the user device. In another embodiment, an editing tool can be provided as an add-on or plug-in to a motion imagery application.

It is to be appreciated that the engines and working of the engines are described as examples herein, and the engines can be used for performing any step in providing digital experience to the user.

Exemplary Motion Imagery Editing Environment

Referring now to FIG. 2, a block diagram of an exemplary environment 200 suitable for use in implementing embodiments of the invention is shown. Generally, the environment 200 is suitable for editing motion imagery that, among other things, facilitates synchronization of audio and motion imagery. The environment 200 includes a user device 210 having an editing tool 212. As described, the editing tool generates and utilizes various relationships between motion imagery and audio aspects to facilitate synchronization. The user device 210 can be any kind of computing device capable of facilitating motion imagery editing. For example, in an embodiment, the user device 210 can be a computing device such as computing device 800, as described below with reference to FIG. 8. In embodiments, the user device 210 can be a personal computer (PC), a laptop computer, a workstation, a mobile computing device, a PDA, a cell phone, or the like.

As illustrated, the user device 210 includes an editing tool 212. The editing tool 212 may be incorporated, or integrated, into an application or an add-on or plug-in to an application, such as application 214. The application 214 may generally be any application capable of facilitating motion imagery editing. As can be appreciated, in some embodiments, in addition to facilitating motion imagery editing, application 214 may also facilitate the presentation of the motion imagery. Application 214 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One exemplary application that may be used for motion imagery editing is ADOBE AFTER EFFECTS, which is a digital visual effects, motion graphics, and composition application used in post-production process. Although generally discussed herein as the editing tool 212 being associated with an application, in some cases, the editing tool 212, or portion thereof, can be additionally or alternatively integrated into the operating system (e.g., as a service) or a server (e.g., a remote server).

The editing tool 212 is generally configured to facilitate motion imagery editing. In particular, editing tool 212 is used to synchronize audio with motion imagery. As such, a motion imagery can be edited to align or correspond with a particular aspect(s) of audio data. In this way, an imagery feature(s) can be synchronized with an audio feature(s). An imagery feature refers to any feature or attribute associated with a motion imagery. As described, motion imagery, as used herein, refers to a sequence of images or frames that can be presented over time. Motion imagery can be, for example, motion graphics and/or videos. By way of example only, imagery features may include position, rotation, opacity, scale, and/or color associated with a motion imagery component. An audio feature refers to a feature or attribute associated with an audio. By way of example only, audio features may include beats, events, and/or amplitudes associated with audio.

At a high level, to synchronize or align an imagery feature with an audio feature, a relationship(s) or association(s) can be created therebetween. For instance, a user may select an audio feature (e.g., amplitude) to associate with an imagery feature (e.g., rotation). Based on the user indication, a relationship can be generated between the audio feature and the imagery feature. Such a relationship can then be used to synchronize the motion imagery with the audio. Accordingly, a user can efficiently generate a desired synchronization of motion imagery to audio. For instance, a user may efficiently set a visual property, such as scale, to relate to audio amplitude such that the visual property of an object within a motion imagery increases or decreases in accordance with the amplitude of the audio.

In embodiments, motion imagery editing, via editing tool 212, may be initiated and/or presented via an application 214 operating on the user device 210. In this regard, the user device 210, via an application 214, might allow a user to initiate motion imagery editing. Motion imagery editing might be initiated in any number of ways. In one example, an editing tool might be initiated by selecting a motion imagery to edit. As another example, an editing tool may be initiated in accordance with opening or launching an application, such as application 214, or opening or launching an existing motion imagery (e.g., previously designed by a user).

As shown in FIG. 2, the editing tool 212 can include an editing user interface (UI) provider 216, an editor 218, and a motion imagery presenter 220. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The functionality described herein can be performed with respect to any number of components. For example, presentation of a motion imagery may be performed by the editing user interface provider 216 and/or the editor 218. Further, although the editing tool 212 is illustrated in connection with the user device 210, as can be appreciated, functionality described herein may be additionally or alternatively carried out remotely, for example, via a server or other component in connection with the user device 210.

In operation, the editing user interface provider 216 can provide an editing experience that enables a user to provide input in an effort to facilitate motion imagery editing. In particular, the editing user interface provider 216 enables a user to initiate relationships between an audio feature(s) and an imagery feature(s) to synchronize the corresponding audio and motion imagery.

In this regard, to enable editing, the editing user interface provider 216 can provide motion imagery data and audio data such that editing can occur. Motion imagery data refers to data associated with a motion imagery. As described herein, motion imagery data can include the motion imagery (e.g., motion graphics or video) and/or imagery features associated with a motion imagery. Motion imagery data can be presented in any number of ways. In some implementations, a motion imagery may be presented in a motion imagery viewing region while imagery features are presented in a motion imagery editing region. The examples provided herein are intended merely to illustrate exemplary embodiments of motion imagery data presentation and are not intended to be limiting.

As described, a motion imagery viewing region may be provided to present a motion imagery to be or being edited. In this regard, the motion imagery can be presented in a portion or region that presents the motion imagery over time. A motion imagery provided for editing can be obtained in any number of ways. In some embodiments, a user might select a motion imagery for editing and/or presentation. As another example, a user may generate or create a motion imagery, for example, by selecting components or objects and placing such components to create the motion imagery.

A motion imagery editing region may be provided to present imagery features associated with a motion imagery that may be edited. A motion imagery editing region may include any type or amount of motion imagery data associated with a motion imagery, such as a motion imagery presented within a motion imagery viewing region. In some embodiments, the motion imagery editing region includes a timeline, a motion imagery component(s), and an imagery feature(s). A timeline may be used to control playing or viewing of the motion imagery as well as to facilitate editing. For example, to control motion imagery viewing, a playhead can be moved to an instance of the timeline at which to present the motion imagery, for example, in a static mode (e.g., present the corresponding frame) or in a play mode (e.g., point at which to begin playing the motion imagery). As another example, and as described in more detail below, the timeline can be used as a measure for creating relationships between the motion imagery and audio. Although a timeline is described in relation to the motion imagery editing region, as can be appreciated, a timeline may be presented independent of such a region.

Motion imagery components refer to various components or objects that may be manipulated in association with a motion imagery. In some cases, the entire motion imagery is a component. In this regard, the entire motion imagery can be manipulated (e.g., scaled in size, moved in position, etc.). Additionally or alternatively, a motion imagery may have components or objects presented within the motion imagery. As can be appreciated, such components might be presented during the entirety of the motion imagery, or a portion of the motion imagery. For example, one object (e.g., a triangle) may be present during a first portion of the motion imagery, a second object (e.g., a circle) may be present during the entire motion imagery, and a third object (e.g., a square) may be present during a second portion of the motion imagery. Motion imagery components associated with a motion imagery may be identified in any number of ways. In one example, motion imagery components presented may be selected by a user to be included in a motion imagery. As another example, a motion imagery selected by a user may be analyzed to identify any components that may be manipulated, for example, using an object identification technique.

Further, in addition to presenting components to be manipulated, aspects or features of such components (imagery features) to manipulate can also be presented. Imagery features may include any type of feature that may be used to modify a motion imagery component(s). Imagery features may include, for example, position, rotation, opacity, scale, color, or the like. As can be appreciated, a set of imagery features may be associated with or correspond to each imagery feature component. In some cases, the set of imagery features may be the same for each component. In other cases, the set of imagery features may be unique to the components. The set of imagery features that may be modified in association with a component may be selected by a user or automatically selected. For instance, a set of default imagery features may be user selected or system selected and presented in association with a component. As another example, a specific component may be analyzed and assessed to determine which imagery features may be manipulated in association with the component.

As described, an audio data region may also be presented. Audio data presented is generally based on an audio, for example, as selected by a user. An audio to synchronize with a motion imagery may be in any number of formats, such as a WAV file, etc. The audio data region may include any type or amount of data associated with the audio. In some embodiments, the audio data region includes a waveform and audio features. An audio waveform may be represented in any number of manners. As one example, a waveform may include base, mid, and treble frequency waves. Such waves may be presented in a combined or separated manner. Audio features may represent any aspect of an audio. In embodiments, audio features can be used to manipulate motion imagery components. In this regard, motion imagery components can be modified in a manner that corresponds with an audio feature. Audio features may include, for example, amplitude, events, beats, rhythmic pulse, etc. An event generally refers to an interesting transition point in time. For instance, an event may be a note or a cord in a song. Events can be detected and visually presented in any manner. For instance, events may be detected from executing an algorithm to extract valuable information from an audio and placed in association with a timeline. In this regard, events can be visually indicated by markers on a timeline. As can be appreciated, each audio feature can be represented in association with a timeline, such as a timeline that corresponds with the motion imagery. In this way, the occurrence of a feature can be designated by an indicator or marker on a timeline. For example, beats can be indicated by beat markers presented in association with a timeline, while amplitude can be indicated by an amplitude wave presented in association with the timeline. Presenting the audio features in such a manner provides visibility of various audio aspects to a user.

In some embodiments, motion imagery data and audio data are concurrently or simultaneously presented to enable efficient editing. To this end, concurrently presenting motion imagery data and audio data enables a user to efficiently generate relationships between the audio and motion imagery.

Figure 3:
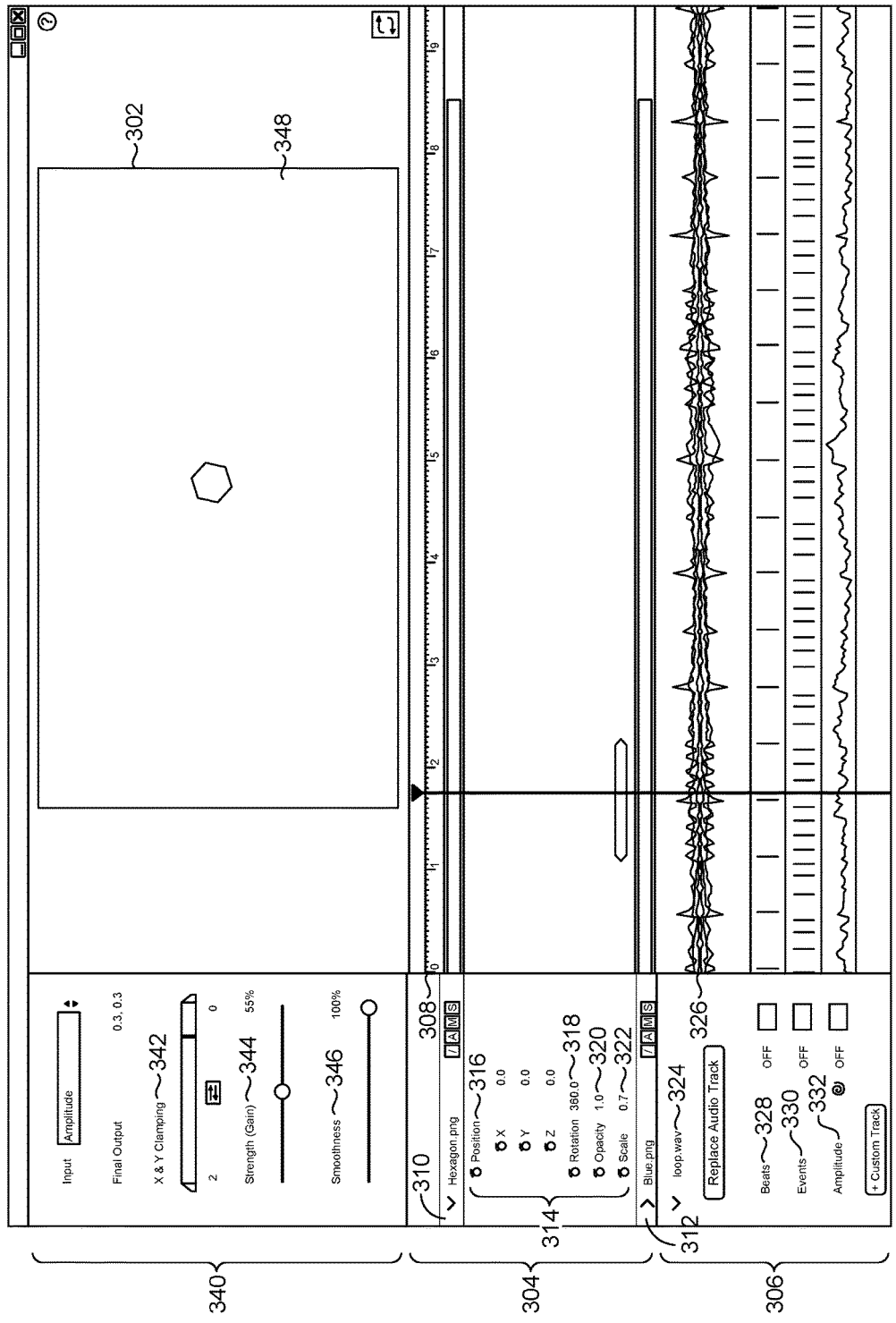
FIG. 3 illustrates an exemplary user interface for editing motion imagery, in accordance with embodiments of the present invention.

By way of example only, and with reference to FIG. 3, FIG. 3 illustrates an exemplary user interface 300 of an editing tool. User interface 300 includes a motion imagery viewing region 302, a motion imagery editing region 304, and an audio data region 306. The motion imagery viewing region 302 provides an area in which motion imagery 348 can be presented to the user (e.g., in a static mode or a play mode). The motion imagery editing region 304 includes a timeline 308 and components 310 and 312. Components 310 and 312 represent the "hexagon" component presented in the motion imagery 304 and the "blue" background component presented in the motion imagery 348. Such components 310 and 312 may be individually selected by a user, or may be populated in the motion imagery editing region 304 based on a selection of motion imagery 348, which includes components 310 and 312. As illustrated, "hexagon" component 310 includes a set of imagery features 314. Imagery features 314 include position 316, rotation 318, opacity 320, and scale 322, although any number and type of imagery features may be associated with a component. Further, although not illustrated, a set of imagery features may also be associated with the "blue" component 312.

The audio data region 306 includes audio data associated with a selected audio file, as indicated by numeral 324. Audio data region 306 includes a waveform 326 and various audio features including beats 328, events 330, and amplitude 332. As shown, beats 328 have an associated set of beat indicators that correspond with the timeline, events 330 have an associated set of event indicators that correspond with the timeline, and amplitude 332 have an associated amplitude wave that corresponds with the timeline. As will be described in more detail below, the user interface 300 can be interacted with by a user to edit the motion imagery such that aspects of the motion imagery align or synchronize with the audio.

Returning to FIG. 2, the editor 218 is generally configured to enable editing of the motion imagery. In particular, the editor 218 facilitates editing to synchronize audio with the motion imagery. At a high level, to synchronize or align a motion feature with an audio feature, a relationship(s) or association(s) can be created therebetween. For instance, a user may select an audio feature to associate with an imagery feature. Based on the user indication, a relationship can be generated between the audio feature and the imagery feature and utilized to effectuate a desired synchronization.

In accordance with presenting various audio and motion imagery data, a user may elect to edit the motion imagery. In particular, a user may correlate or relate an audio feature with an imagery feature. Accordingly, the editor 218 may identify, receive or detect user input to create a relationship between audio and a motion imagery. To this end, a user may select, input, or otherwise designate a relationship between an imagery feature(s) and an audio feature(s). User input can be provided in any manner, including utilization of touch input, selector input (e.g., via a mouse), keyboard input, etc. Exemplary user inputs to edit motion imagery, such as initiating relationships, are provided below, but such editing may be initiated at the user device 210 in any manner and is not limited to implementations described herein.

According to embodiments of the present invention, a user can select to bind or relate an audio feature with an imagery feature. In this regard, an imagery feature associated with a component can be related to an audio feature such that the imagery feature synchronizes with the audio feature. Accordingly, as the audio plays, the imagery feature changes in association therewith.

Based on user input to generate a relationship, the editor 218 can create relationships between an imagery feature and an audio feature. A relationship between an imagery feature and an audio feature can be generated or represented in association with a designated or selected portion of a timeline, generally referred to herein as a key frame or key frame range. A key frame designates or defines an instance during which an association occurs. A key frame range (or key range) refers to a range of key frames. In embodiments, a key range is a dynamically generated range of key frames. As described herein, key frames, or key frame ranges, correspond with instances or time during which the audio is related to or bound to motion imagery. In this regard, the key frame or range designates an instance or portion of time during which an audio feature is synchronized with an imagery feature.

Accordingly, in addition to receiving an indication of related features, the editor 218 may receive input of a selection of a key frame or key frame range at or during which audio and imagery features are related. A user can select or designate placement of key frames, or ranges, in any number of ways. As one example, to place a key frame along a timeline, a user may select a key frame indicator associated with an audio feature and then select a point on the timeline corresponding with an imagery feature to be associated therewith. As another example, a user may select a key frame indicator associated with an audio feature and drag-and-drop to an imagery feature to be associated therewith. In this example, a key frame may be automatically placed along the timeline, for instance, in a default or identified location. Selecting a key frame range may occur in a similar manner. For instance, a user may select a key frame range indicator associated with an audio feature and then select a time range on the timeline corresponding with an imagery feature to be associated therewith. As another example, a user may select a key frame range indicator associated with an audio feature and drag-and-drop to an imagery feature to be associated therewith. In this example, a key frame range may be automatically placed along the timeline, for instance, in a default or identified location. In some cases, a user may place a key frame and then expand the key frame to a range (e.g., drag an edge of a key frame marker), or the like.

In accordance with placing a key frame or key frame range in association with a timeline, the selected audio and imagery features are associated with or related to one another at that designated instance or time range. In this way, the imagery feature, or value associated therewith, changes or is modified in the motion imagery in accordance with the designated audio feature during the time at which the features are related. Stated differently, at the instance of a key frame or key frame range, an imagery feature is manipulated in a manner that corresponds with the related audio feature.

By way of example only, assume a "beat" audio feature is related to a "scale" imagery feature of a motion imagery component in accordance with a key frame range. In operation, when the playing or previewing the motion imagery, during the time associated with the key frame range, the scale of the component is modified to correspond with the beat of the audio. For instance, at each beat, the scale of the component may instantaneously increase and then return to original size until the next beat associated with the key range. Alternatively, the scale of the component may peak or maximize at each beat associated with the key range.

As another example, assume an "amplitude" audio feature is related to a "rotation" imagery feature of a motion imagery component in accordance with a key frame range. In operation, when playing or previewing the motion imagery, during the time associated with the key frame range, the component may be rotated to correspond with the amplitude of the audio. For instance, as the amplitude increases above an average or default amplitude, the component may rotate clockwise, and as the amplitude falls below the average or default amplitude, the component may rotate counter-clockwise.

As can be appreciated, any type of relationship can be created in accordance with embodiments of the present invention. For instance, an "amplitude" audio feature can be related to position, rotation, opacity, and/or scale associated with a component. Similarly, an "events" audio component can be related to position, rotation, opacity, and/or scale associated with a component. Further, any number of audio-imagery relationships may occur in association with a motion imagery. To this end, any number of key frames and/or key frame ranges relating audio and imagery features can be used. For instance, a first key frame range may relate amplitude to scale at a first instance of the motion imagery, a second key frame range may relate amplitude to scale at a second instance of the motion imagery, a third key frame range can relate events to rotation at a third instance of the motion imagery, and so on.

The instance(s) at which relationships occur can be modified via modification of key frames or key frame ranges, for example. In this regard, a user may modify a key range or key frame to modify a time at which an imagery feature for a component is related to an audio feature. Modification of key frames or key frame ranges can be performed in any number of ways. For instance, a user may move or slide a key frame or key frame range along a timeline or in association with a timeline. To increase or decrease the duration of the key frame range, a user may move or slide the end points of the key frame range. For example, the end(s) of a key frame range may be moved inward (e.g., towards the center of the key frame range) to reduce the time during which an audio feature is related to an imagery feature.

As described, based on an audio-imagery relationship, an imagery feature of a component is manipulated in accordance with the audio. The manipulations applied to the components (component manipulations) can be effectuated in any manner. For example, a manipulation may be instantaneous or gradual. For instance, assume an imagery feature is related to a beat. At the occurrence of the beat, the imagery feature may be instantaneously altered or maximized on a gradual basis. Further, although manipulations are generally described herein in a directly related manner, as can be appreciated, such manipulations may occur in an inverse manner. For example, in some cases, the scale of a component may increase as the amplitude increases, while in other cases, the scale of the component may decrease as the amplitude increases.

In some cases, component manipulations to apply may be based on default manipulation properties. For instance, the direction and/or extent to which to manipulate a component may be predetermined and applied in accordance with the audio. A manipulation property refers to a property or manner indicating how a component is manipulated. In other cases, manipulation properties may be user selected or customized. In this regard, based on the audio feature and/or imagery feature, a user may alter or modify various properties of the manipulation. For example, assume a "scale" imagery feature is related to an "amplitude" audio feature. In such a case, a user may select an amount or range of x and y clamping, strength (gain), and/or smoothness to apply in manipulating the component. In some cases, a default measure or range may be initially used and, if desired, can be edited by a user. For instance, clamping may initially be configured to scale between 0 and 1. A user, however, may select to reduce the scale to between 0.4 and 0.7 such that the scaling range is reduced. Such manipulation properties can be customized on a per audio-imagery binding basis or on a global basis (e.g., applied to each relationships or each relationship associated with a particular audio or imagery feature). By way of example only, and with brief reference to FIG. 3, a manipulation properties region 340 includes a clamping property 342, a strength property 344, and a smoothness property 346. A user can select to modify any of such properties to designate or restrict properties effecting scale manipulation of the component based on amplitude of the audio.

As can be appreciated, in embodiments, the created relationships are persistent. Accordingly, in some embodiments, assume an audio feature and an imagery feature are related in association with a key frame range. Now assume that a user desires to use a different audio file in association with the motion imagery. As such, the user replaces the audio track. Based on the persistent relationship, the audio feature and imagery feature remain related in association with the key frame. Now, when the motion imagery is played or previewed, the imagery feature (e.g., scale) synchronizes with the audio feature (e.g., amplitude) of the new audio track. As such, the key range remains the same, but the value of the imagery feature (e.g., scale) is updated in connection with the new audio track (e.g., amplitude). As with the original audio, the user may modify or edit the relationship, for example, move the key frame.

In addition to creating relationships in accordance with key frames or ranges, the editor 218 can facilitate application of additional or alternative editing actions associated with audio. Such additional functionality may include snapping and smart looping. In this regard, when placing or modifying a key frame or key frame range, snapping visual feedback may be provided to assist a user with placement. For example, assume a user is modifying a key frame range by dragging a key range end point along the timeline. In such a case, a visual feedback may be provided to align the end point with a next or nearest beat, event, or amplitude peak, for example.

With regard to looping, looping generally refers to a repeating section or portion of audio and/or motion imagery. When looping is desired, the editor 218 may identify a nearest audio feature, such as a beat, and then create a loop based on the feature. For instance, the editor 218 might identify a nearest beat and create a loop that extends a predetermined number of beats (e.g., 4 beats, 6 beats, etc.). The length of the loop may be predetermined or dynamically identified. For example, the length of the loop (e.g., 6 beats) may be determined based on the total length of the audio or the portion of the motion imagery associated with the loop, etc.

In accordance with some embodiments, a motion imagery presenter 220 of the editing tool 212 can present a viewing or preview of the motion imagery in accordance with the selected component manipulations. In this regard, a user may select to view the motion imagery and, in response, be presented with the motion imagery that is synchronized with the audio. Such a presentation may occur in the editing user interface or a separate user interface. By way of example, with reference to FIGS. 4A-4D, FIGS. 4A-4D illustrate exemplary user interfaces representing snapshots of a motion imagery being presented in accordance with an audio synchronization.

Figure 4A:
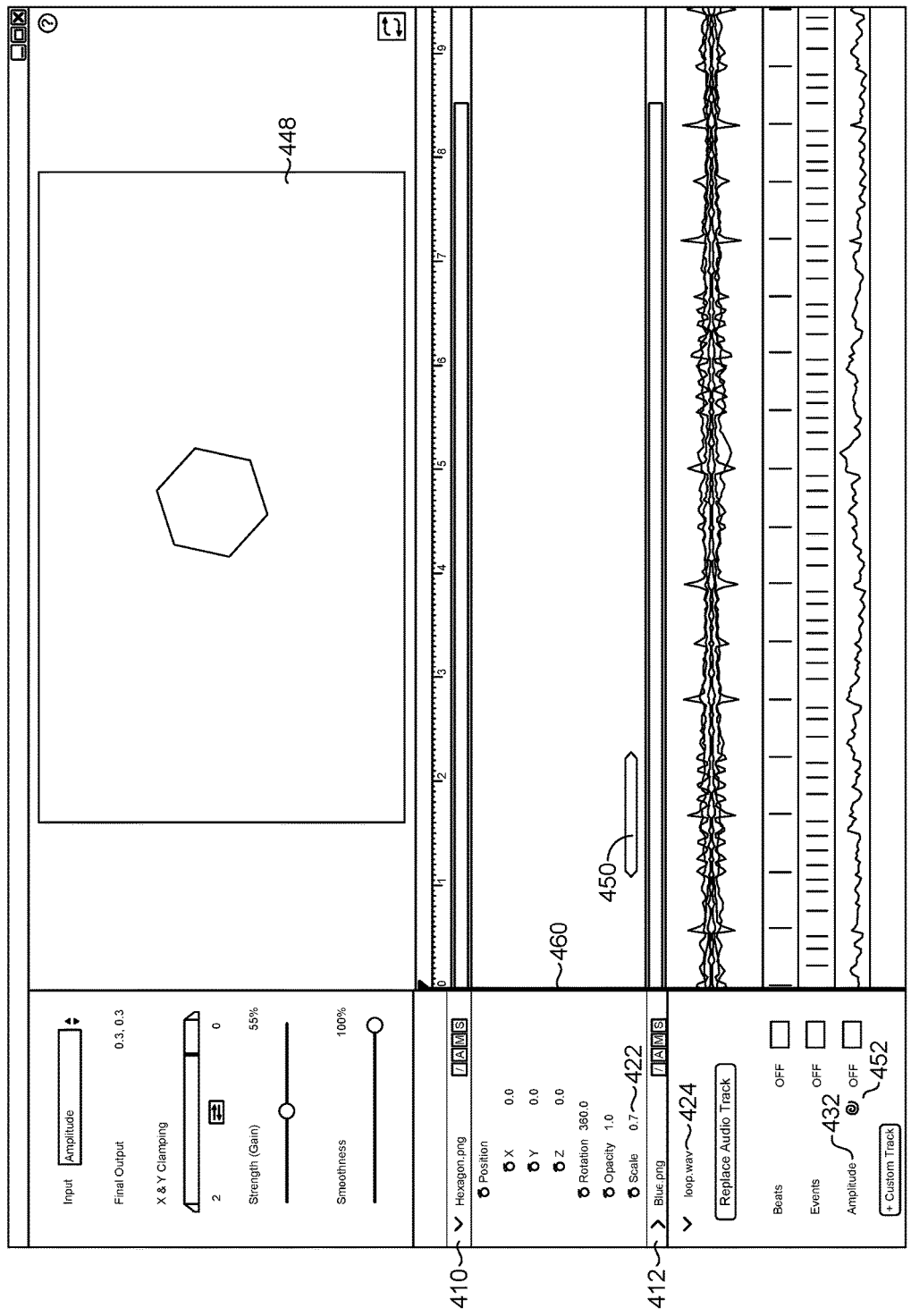
FIGS. 4A-4D illustrate exemplary user interfaces presenting a motion imagery synchronized with audio, in accordance with embodiments of the present invention.
Figure 4B:
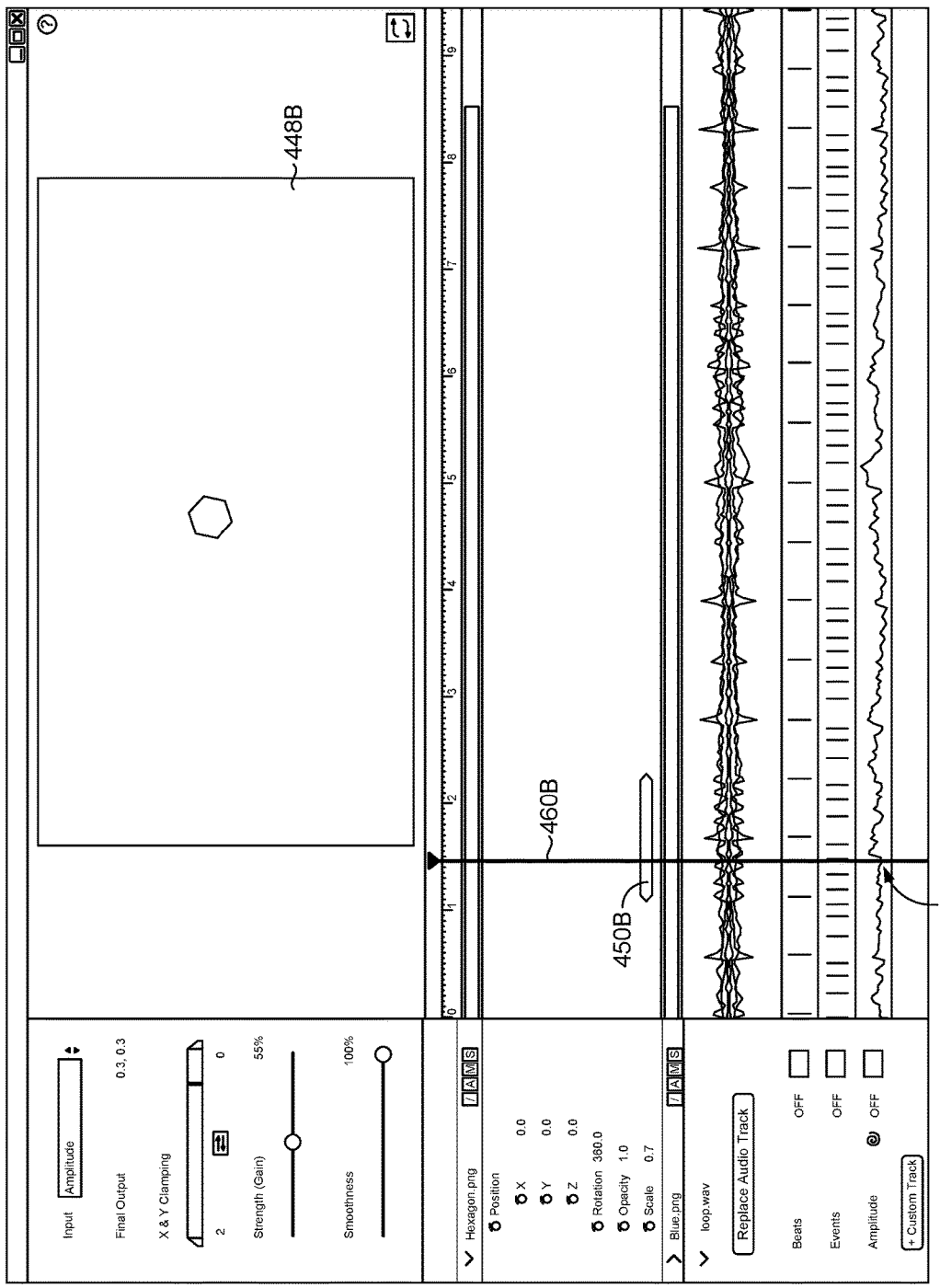

Turning initially to FIG. 4A, assume a motion imagery has been selected for editing that includes a hexagon component 410 and a blue background component 412. Further assume that a key frame range 450 has been created during which the scale 422 of the hexagon component 410 is related to the amplitude 432 of the audio track 424. The key frame range 450 may have been generated in any number of ways. For example, the user may have selected key frame range indicator 452, and drag-and-dropped the key frame range indicator 452 in connection with the scale feature 422 or the corresponding timeline. In accordance with one implementation of the technology described herein, the key frame range 450 may be color-coded (e.g., blue) to match the color of the text of the amplitude feature 432 such that the relationship between the scale feature and amplitude feature is visually apparent. Other implementations to visually present relationships may be contemplated, such as, utilization of patterns, symbols, icons, etc.

Now assume the user selects to view or preview the motion imagery. As shown in FIG. 4A, the playhead 460 may begin at time 0. In such a case, the hexagon component in the motion imagery 448 is presented in an initial size. As the motion imagery plays, the scale of the hexagon component is manipulated in accordance with the amplitude during the time that coincides with the key frame range. For instance, with reference to FIG. 4B, the playhead 460B is shown at position 462B. As shown, position 462B corresponds with the key frame range 450B and, as such, the scale is related to the amplitude. Because the amplitude is small at position 462B, the scale of the hexagon is small, as shown in motion imagery 448B.

Figure 4C:
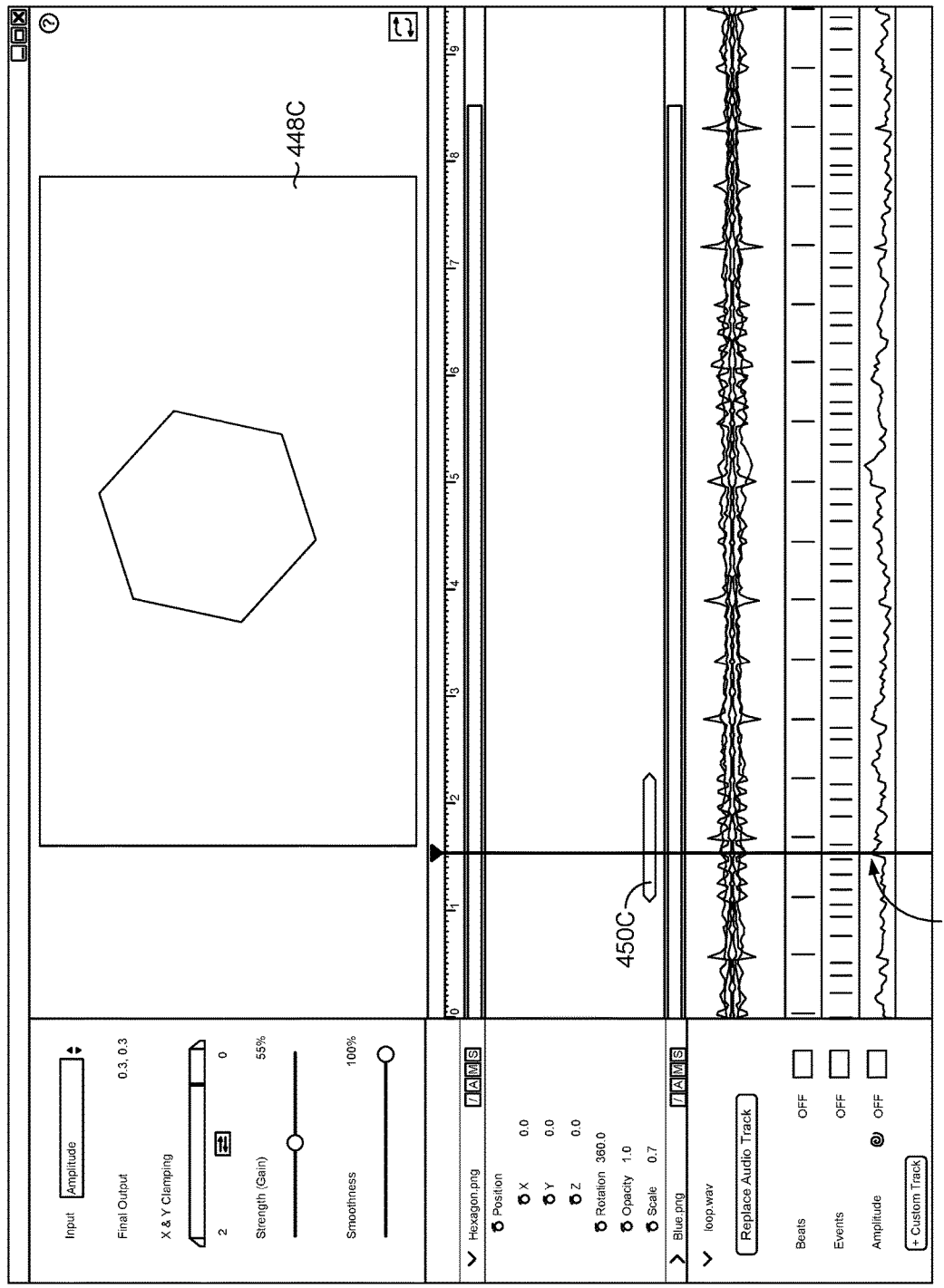
Figure 4D:
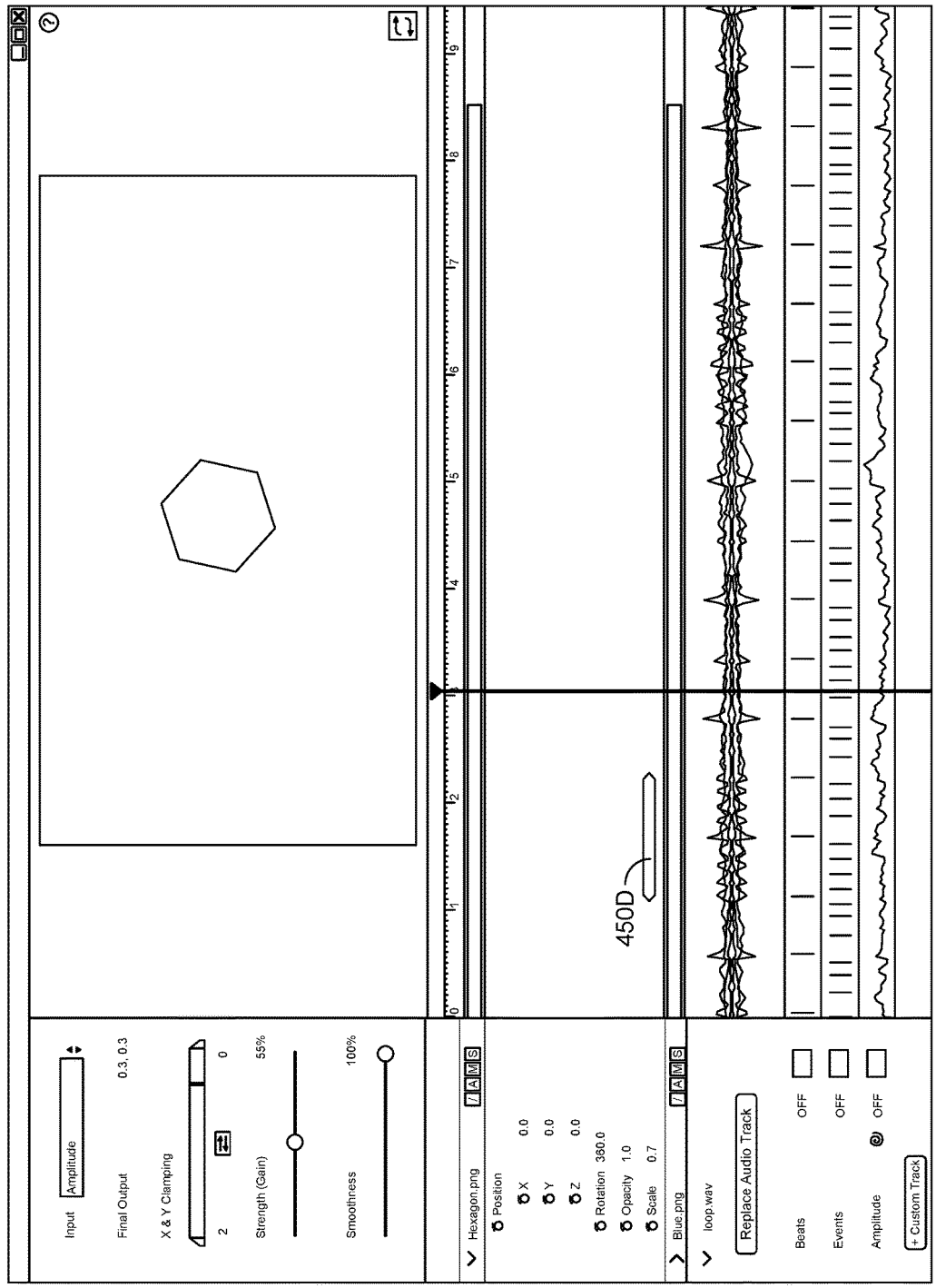

Now assume the playhead continues to position 464C of FIG. 4C. As shown, position 464C corresponds with the key frame range 450C and, as such, the scale continues to be related to the amplitude. Because the amplitude is relatively large at position 464C, the scale of the hexagon component is large, as shown in motion imagery 448C. As the playhead continues through positions that correspond with the key frame range 450C, the scale of the hexagon component continues to resize in accordance with the amplitude of the audio. As shown in FIG. 4D, when the playhead continues to a position outside of the key frame range 450D, the scale of the hexagon component is no longer related to the amplitude of the audio and, as such, is not modified in accordance therewith.

As can be appreciated, any number or type of relationships can be generated and used to manipulate various components associated with a motion imagery in accordance with an audio.

Exemplary Flow Diagrams

Figure 5:
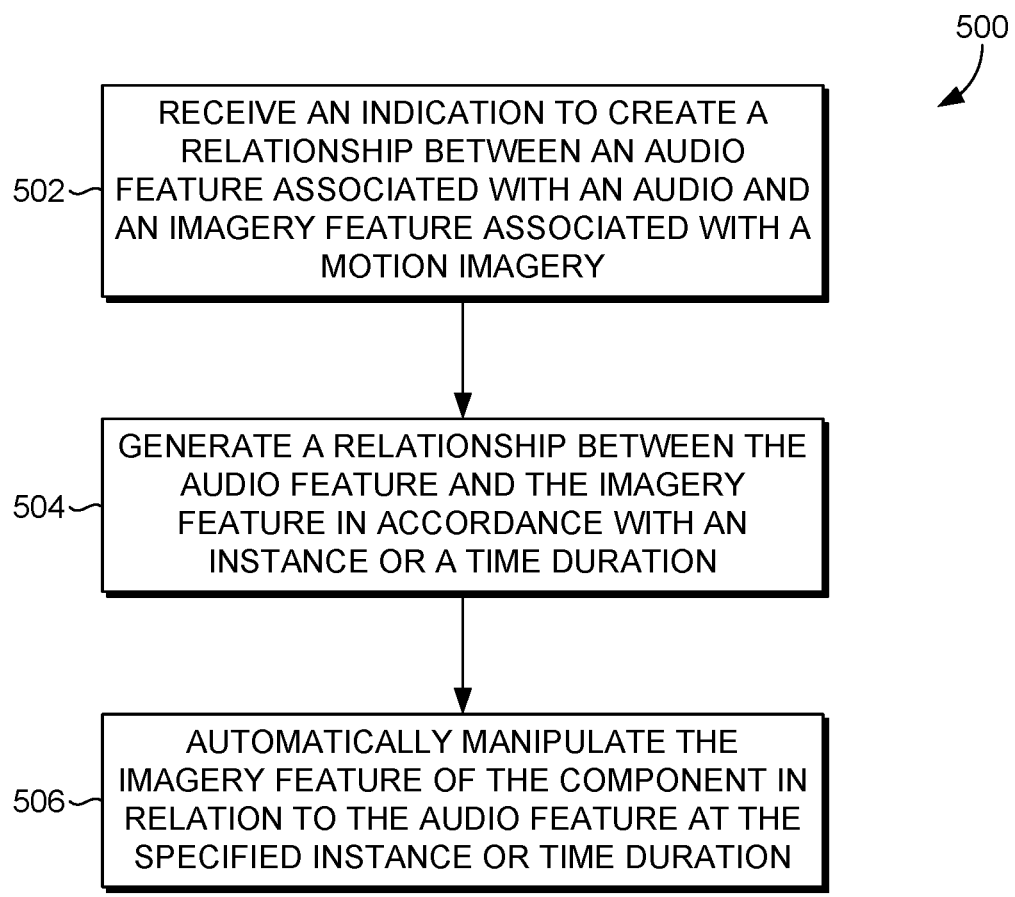
FIG. 5 is a flow diagram showing a method for facilitating motion imagery editing according to various embodiments of the present invention.
Figure 6:
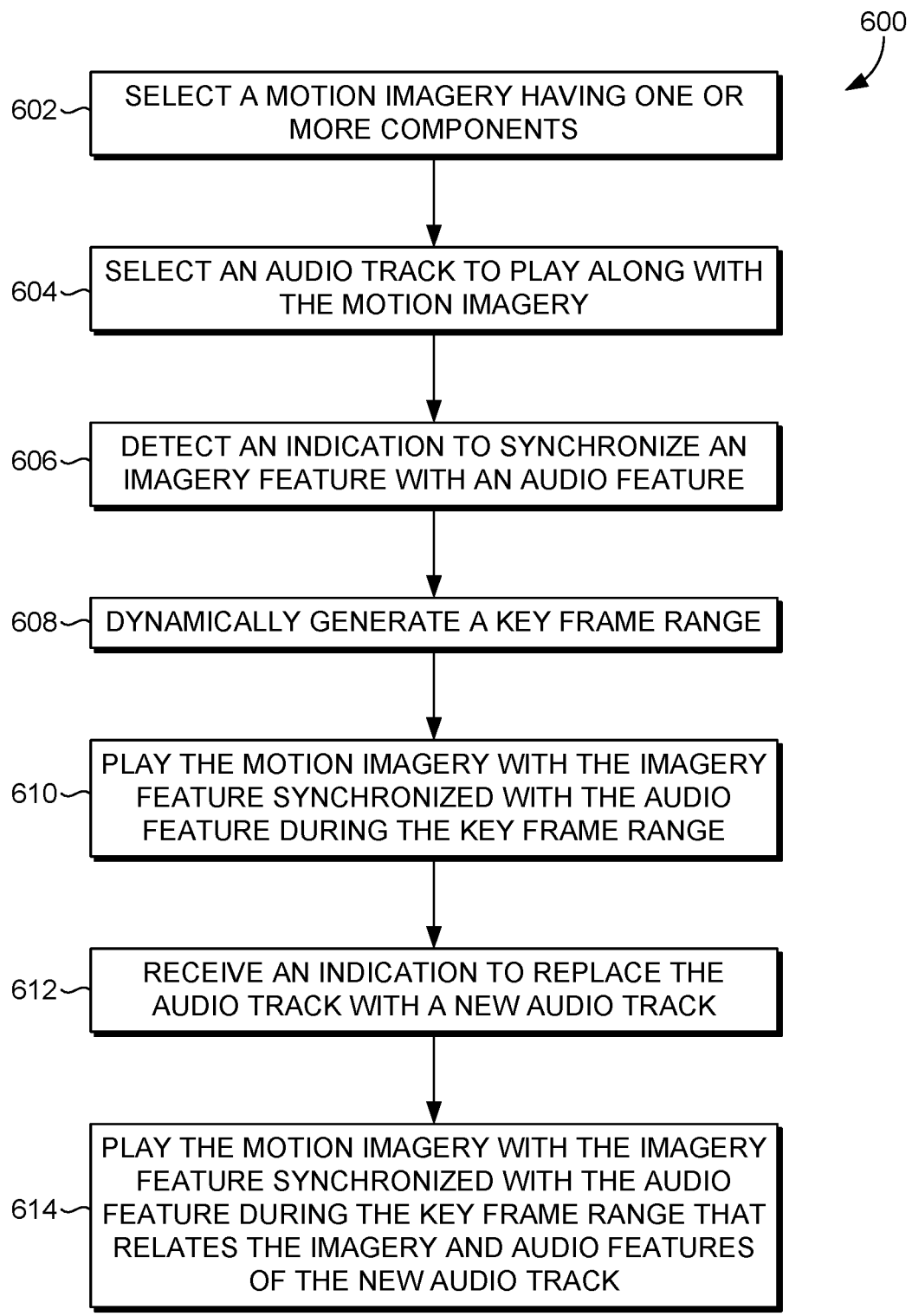
FIG. 6 is a flow diagram showing another method for facilitating motion imagery editing according to various embodiments of the present invention.
Figure 7:
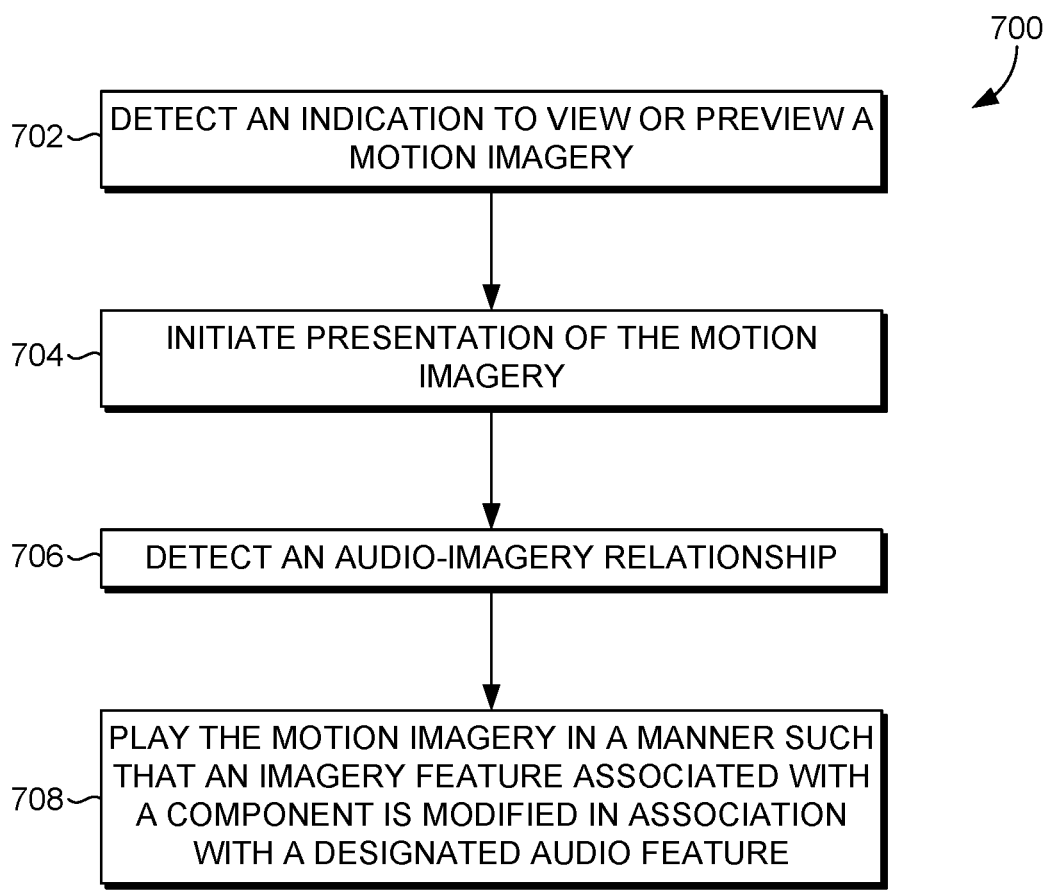
FIG. 7 is a flow diagram showing presentation of a motion imagery having related audio and imagery features, according to one embodiment of the present invention.

With reference now to FIGS. 5-7, flow diagrams are provided illustrating methods for synchronization of audio with motion imagery. Each block of the methods 500, 600, and 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 5, FIG. 5 illustrates a method 500 for synchronizing audio and motion imagery, in accordance with embodiments described herein. At block 502, an indication to create a relationship between an audio feature associated with an audio and an imagery feature associated with a motion imagery is received. A user may provide an indication in any number of ways, such as, for example, dragging and dropping an audio feature in association with an imagery feature, selecting audio and imagery features, etc. At block 504, a relationship between the audio feature and the imagery feature is generated in accordance with an instance or a time duration. In this regard, a relationship between the audio and imagery features is created to synchronize the audio with the motion imagery at a particular instance or time duration. Such a relationship can be represented using a key frame or a key frame range placed in association with a timeline. Based on the relationship between the audio feature and the imagery feature, the imagery feature of the component is automatically manipulated in relation to the audio feature at the specified instance or time duration. This is indicated at block 506. In such a case, as the audio feature changes at the instance or time duration, the imagery feature is modified to correspond with the audio feature changes. For instance, as amplitude of an audio track increases, an associated scale or opacity imagery feature can increase. Such manipulations or modifications may be proportional or based on any determination or calculations.

Turning now to FIG. 6, a flow diagram is provided that illustrates a method 600 for synchronizing audio and motion imagery, in accordance with embodiments described herein. As shown at block 602, a motion imagery having one or more components is selected. At block 604, an audio track is selected to play along with the motion imagery. At block 606, an indication to synchronize an imagery feature with an audio feature is detected. Such an indication can be provided by a user in any manner. At block 608, a key frame range is dynamically generated. The key frame range represents a time duration during which the imagery feature is related to the audio feature. As can be appreciated, the key frame range can be modified, for example, by a user to modify the time duration during which the imagery and audio features are related (e.g., change the length, change the start time, change the end time, etc.). At block 610, the motion imagery is played with the imagery feature synchronized with the audio feature during the key frame range. In such a case, the imagery feature is manipulated in accordance with a first set of values that align with the audio feature during the key frame range. At block 612, receive an indication to replace the audio track with a new audio track. Subsequently, at block 614, the motion imagery is played with the imagery feature synchronized with the audio feature during the key frame range that relates the imagery and audio features of the new audio track. In such a case, the imagery feature is manipulated in accordance with a second set of values that align with the audio feature during the key frame range.

Turning now to FIG. 7, a flow diagram is provided that illustrates a method 700 for presenting a motion imagery having related audio and imagery features, according to embodiments provided herein. Initially, at block 702, an indication to view or preview a motion imagery is detected. At block 704, presentation of the motion imagery is initiated. During the presentation of the motion imagery, at block 706, an audio-imagery relationship is detected. For example, a key frame or key frame duration along the play timeline may be identified. At block 708, the motion imagery is played in a manner such that an imagery feature associated with a component is modified in association with a designated audio feature. For instance, as amplitude of the audio increases, a component within the motion imagery may be rotated in one direction, while the motion imagery may be rotated in the opposite direction when the audio amplitude decreases.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Exemplary Operating Environment

Having described an overview of embodiments of the present invention, an exemplary operating environment in which embodiments of the present invention may be implemented is described below in order to provide a general context for various aspects of the present invention. Referring now to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:

receive a first indication to create a first relationship between a first audio feature of a plurality of audio features associated with an audio and a first imagery feature of a modifiable object within a set of frames of a motion imagery, wherein the first indication includes a selection of a start time and a selection of an end time of the first relationship within a timeline, the timeline extending from a beginning to an end of the audio;

generate the first relationship between the first audio feature and the first imagery feature of the modifiable object within the set of frames of motion imagery, the generated first relationship corresponding with a first time duration to synchronize the audio with the motion imagery during the first time duration, wherein the first time duration is a portion of the timeline from the selected start time to the selected end time;

receive a second indication to create a second relationship between a second audio feature of the plurality of audio features associated with the audio and the first imagery feature, wherein the second indication includes a second time duration for the second relationship within the timeline, and the second audio feature is different from the first audio feature;

generate the second relationship between the second audio feature and the first imagery feature, the generated second relationship corresponding to the second time duration to synchronize the audio with the motion imagery during the second time duration; and based on the first relationship and the second relationship, automatically manipulate the first imagery feature within the set of frames in relation to the first audio feature and the second audio feature during the first time duration and the second time duration.

2. The one or more non-transitory computer storage media of claim 1, wherein the plurality of audio features include at least beats, amplitude, events, and rhythmic pulse.

3. The one or more non-transitory computer storage media of claim 1, wherein the first imagery feature comprises one of position, rotation, opacity, or scale.

4. The one or more non-transitory computer storage media of claim 1, wherein the motion imagery comprises a motion graphic having a plurality of modifiable objects.

5. The one or more non-transitory computer storage media of claim 1 further comprising receiving an indication to modify the first time duration at which the first audio feature is related to the first imagery feature, wherein the indication includes movement of a playhead to a third time duration of the timeline.

6. The one or more non-transitory computer storage media of claim 5, wherein based on modify the first time duration at which the first audio feature is related to the first imagery feature, automatically manipulate the first imagery feature of the modifiable object within the set of frames in relation to the first audio feature the third time duration.

7. The one or more non-transitory computer storage media of claim 1 further comprising presenting the motion imagery, wherein the first imagery feature of the modifiable object within the set of frames changes in accordance with the first audio feature at the first time duration at which the first imagery feature is related to the first audio feature.

8. The one or more non-transitory computer storage media of claim 7, wherein the first imagery feature of the modifiable object within the set of frames does not change in accordance with the first audio feature when the first imagery feature is not related to the first audio feature in the timeline.

9. The one or more non-transitory computer storage media of claim 1, wherein the first imagery feature of the modifiable object within the set of frames increases as the first audio feature increases.

10. The one or more non-transitory computer storage media of claim 1, wherein the second time duration is different that the first time duration within the timeline.

11. A computerized method to facilitate motion imagery and audio synchronization, the method comprising:
- receiving a first indication to create a first relationship between a first audio feature of a plurality of audio features associated with an audio and a first imagery feature of a modifiable object within a set of frames of a motion imagery, wherein the indication includes a selection of a start time and a selection of an end time of the first relationship within a timeline, the timeline extending from a beginning to an end of the audio;
- dynamically generating, via a computing device, a first key frame range defining a first duration of time during which the first audio feature is related to the first imagery feature of the modifiable object within a set of frames of the motion imagery such that the first imagery feature is modified in accordance with the first audio feature, wherein the first duration of time is a portion of the timeline from the selected start time to the selected end time;
- receiving a second indication to create a second relationship between a second audio feature of the plurality of audio features associated with the audio and a second imagery feature of the modifiable object, wherein the second indication includes a second duration of time for the second relationship within the timeline, and the second audio feature is different from the first audio feature;
- dynamically generating, via a computing device, a second key frame range defining a second duration of time during which the second audio feature is related to the second imagery feature such that the second imagery feature is modified in accordance with the second audio feature during the second key frame range; and
- presenting, via the computing device, the motion imagery, wherein the first imagery feature and the second imagery feature is manipulated in accordance with the first audio feature and the second audio feature during the first key frame range and the second key frame range, respectively.

12. The method of claim 11, wherein the audio and the motion imagery are selected for synchronization.

13. The method of claim 11, wherein the first key frame range is placed in association with the timeline at a default position.

14. The method of claim 11, wherein the first key frame range is placed in association with the timeline in accordance with a user selection.

15. The method of claim 11, wherein the presenting of the motion imagery is a preview of the motion imagery provided within an editing user interface.

16. The method of claim 11, wherein the second duration of time is different from the first duration of time.

17. A computer system comprising:
an editing means configured to:
- detect a first input indicating a desire to relate a first audio feature of a plurality of audio features associated with an audio and a first imagery feature of a modifiable object within a set of frames of a motion imagery, wherein the first input includes a selection of a start time and a selection of an end time of a first relationship within a timeline, the timeline extending from a beginning to an end of the audio;
- generate the first relationship between the first audio feature and the first imagery feature of the modifiable object, the first relationship corresponding with a first time duration, wherein the first time duration is a portion of the timeline from the selected start time to the selected end time;
- receive a second input indicating a desire to relate a second audio feature of the plurality of audio features associated with the audio and the first imagery feature, wherein the second input includes a second time duration for a second relationship within the timeline, and the second audio feature is different from the first audio feature;
- generate the second relationship between the second audio feature and the first imagery feature, the generated second relationship corresponding to the second time duration to synchronize the audio with the motion imagery during the second time duration; and
a presentation means configured to present the motion imagery, wherein the first imagery feature of the modifiable object within the set of frames of the motion imagery is manipulated in accordance with the first audio feature and the second audio feature during the first time duration and the second time duration, respectively.

18. The system of claim 17, wherein one or more properties associated with manipulations applied to the first imagery feature are controlled by a user.

19. The system of claim 18, wherein the one or more properties comprise clamping, strength, smoothness, or a combination thereof.

20. The system of claim 18, wherein the motion imagery is presented as a preview within an editing user interface.

* * * * *